(12) United States Patent
Yoshino et al.

(10) Patent No.: US 12,571,481 B2
(45) Date of Patent: Mar. 10, 2026

(54) TIMING ADJUSTMENT VALVE AND SUCKBACK VALVE PROVIDED WITH SAME

(71) Applicant: ASAHI YUKIZAI CORPORATION, Nobeoka (JP)

(72) Inventors: Kenro Yoshino, Nobeoka (JP); Yusuke Kumatabara, Nobeoka (JP)

(73) Assignee: ASAHI YUKIZAI CORPORATION, Nobeoka (JP)

( * ) Notice: Subject to any disclaimer, the term of this patent is extended or adjusted under 35 U.S.C. 154(b) by 251 days.

(21) Appl. No.: 18/580,420

(22) PCT Filed: Jul. 15, 2022

(86) PCT No.: PCT/JP2022/027896

§ 371 (c)(1),
(2) Date: Oct. 3, 2024

(87) PCT Pub. No.: WO2023/002953

PCT Pub. Date: Jan. 26, 2023

(65) Prior Publication Data

US 2025/0035225 A1     Jan. 30, 2025

(30) Foreign Application Priority Data

Jul. 19, 2021     (JP) ................................ 2021-118605

(51) Int. Cl.
*F16K 23/00*          (2006.01)
*F16K 31/122*          (2006.01)
(Continued)

(52) U.S. Cl.
CPC ............ *F16K 23/00* (2013.01); *F16K 31/122* (2013.01); *F16K 15/00* (2013.01); *F16K 15/14* (2013.01);
(Continued)

(58) Field of Classification Search
CPC .... F16K 23/00; F16K 31/122; F16K 31/1221; F16K 15/00; F16K 15/14; F16K 15/142
(Continued)

(56) References Cited

U.S. PATENT DOCUMENTS 4,204,458 A * 5/1980 Kononov ................ F15B 21/12
91/461
5,162,624 A * 11/1992 Duksa ................... H01H 35/405
137/554

(Continued)

FOREIGN PATENT DOCUMENTS

JP        H03-115267 U    11/1991
JP        H08-010399 Y2    3/1996

(Continued)

OTHER PUBLICATIONS

PCT/ISA/210, "International Search Report for PCT International Application No. PCT/JP2022/027896," Sep. 6, 2022.

*Primary Examiner* — Minh Q Le
(74) *Attorney, Agent, or Firm* — HAUPTMAN HAM, LLP

(57) ABSTRACT

A timing adjustment valve includes a pilot body provided with a first port, a second port, and a drive port, a check valve mechanism which allows a fluid to flow from the first port to the second port and prevents the fluid from flowing from the second port to the first port, and a timing adjustment mechanism which opens and closes an internal flow passage by supplying and discharging a drive fluid to and from the drive port. The timing adjustment mechanism is configured to be arranged in parallel with the check valve mechanism in the internal flow passage and allow the fluid to flow when the pressure of the drive fluid supplied and discharged to and from the timing adjustment mechanism through the drive port is equal to or less than a predetermined value.

12 Claims, 4 Drawing Sheets

(51) Int. Cl.
    *F16K 15/00*         (2006.01)
    *F16K 15/14*         (2006.01)

(52) U.S. Cl.
    CPC ........ *F16K 15/142* (2013.01); *F16K 31/1221*
                                          (2013.01)

(58) Field of Classification Search
    USPC ......... 137/312, 512.1, 512.2, 625.26, 596.14
    See application file for complete search history.

(56)                   References Cited

U.S. PATENT DOCUMENTS

| | | | | |
|---|---|---|---|---|
| 5,857,661 | A * | 1/1999 | Amada | F16K 7/075 |
| | | | | 137/467.5 |
| 5,927,605 | A | 7/1999 | Odajima et al. | |
| 5,950,923 | A | 9/1999 | Fukano et al. | |
| 5,950,924 | A | 9/1999 | Hatakeyama et al. | |
| 5,971,296 | A * | 10/1999 | Fukano | B05B 1/28 |
| | | | | 251/63.5 |
| 5,988,524 | A * | 11/1999 | Odajima | F16K 23/00 |
| | | | | 251/63.5 |
| 6,000,629 | A * | 12/1999 | Tamura | F16K 23/00 |
| | | | | 137/340 |
| 6,029,903 | A * | 2/2000 | Fukano | F16K 23/00 |
| | | | | 251/30.02 |
| 6,082,629 | A * | 7/2000 | Lee | F16K 23/00 |
| | | | | 137/467.5 |
| 6,298,873 | B1 * | 10/2001 | LeVey | F16K 15/142 |
| | | | | 137/493 |
| 6,755,354 | B2 * | 6/2004 | Fukano | F16K 23/00 |
| | | | | 251/63.5 |
| 7,143,956 | B2 * | 12/2006 | Fukano | F16K 23/00 |
| | | | | 251/63.5 |
| 7,219,690 | B2 * | 5/2007 | McDonald | F16K 17/30 |
| | | | | 251/118 |
| 7,637,440 | B2 * | 12/2009 | Fukano | F16K 23/00 |
| | | | | 239/104 |
| 8,251,345 | B2 * | 8/2012 | Inoue | F16K 23/00 |
| | | | | 251/63.4 |
| 8,602,383 | B2 * | 12/2013 | Inoue | F16K 23/00 |
| | | | | 251/63.5 |
| 10,458,560 | B2 * | 10/2019 | Yo | F16K 37/0041 |
| 2005/0006609 | A1 * | 1/2005 | Fukano | F16K 31/1225 |
| | | | | 251/63.5 |
| 2015/0090352 | A1 * | 4/2015 | Nishimura | F16K 31/1262 |
| | | | | 137/485 |
| 2019/0063466 | A1 | 2/2019 | Suga et al. | |
| 2024/0337324 | A1 * | 10/2024 | Kumatabara | F16K 23/00 |

FOREIGN PATENT DOCUMENTS

| | | |
|---|---|---|
| JP | H10-267147 A | 10/1998 |
| JP | H10-281335 A | 10/1998 |
| JP | H11-037327 A | 2/1999 |
| JP | 2010-203618 A | 9/2010 |
| JP | 2016-223498 A | 12/2016 |
| JP | 2017-198284 A | 11/2017 |

* cited by examiner

TIMING ADJUSTMENT VALVE AND SUCKBACK VALVE PROVIDED WITH SAME

RELATED APPLICATIONS

The present application is National Phase of International Application No. PCT/JP2022/027896 filed Jul. 15, 2022, and claims priority from Japanese Application No. 2021-118605, filed Jul. 19, 2021, the disclosure of which is hereby incorporated by reference herein in its entirety.

TECHNICAL FIELD

The present invention relates to a timing adjustment valve which can adjust the opening/closing timing of the flow of a fluid in an internal flow passage and a suckback valve provided with the same.

BACKGROUND ART

For example, in a pipe or the like for supplying a liquid such as a chemical solution to a semiconductor wafer in a semiconductor manufacturing apparatus, a suckback valve which sucks back the liquid in the pipe is used to prevent the liquid from dripping out of the end portion of the pipe after the supply of the liquid is stopped. As the suckback valve, there is generally one having a mechanism which can supply and discharge a drive fluid to and from a cylinder chamber accommodating a piston to move the piston, and increase or decrease a volume of a suck-back chamber being in communication with the pipe by elastic deformation of a diaphragm interlocking with the piston to suck back the liquid in the pipe (see, for example, PTL1). Such a suckback valve is arranged downstream of an opening/closing valve for opening and closing a fluid passage in the pipe. Further, as described in PTL2 and PTL3, there is also known a suckback valve integrally provided with an opening/closing valve unit for performing the opening/closing of a fluid passage and a suck-back mechanism unit for sucking back liquid in the fluid passage.

When the opening/closing valve and the suckback valve are controlled in operation individually, matching of the timing of closing off the flow of the liquid by the opening/closing valve with the timing of sucking back the liquid by the suckback valve is difficult, and the control becomes complicated. For this reason, in many cases, the pipes branched from one common switching valve for switching between the supply and discharge of the drive fluid are connected to the opening/closing valve unit and the suck-back mechanism unit, and the operations of the opening/closing valve unit and the suck-back mechanism unit are controlled by the operation of one switching valve.

When the opening/closing valve unit and the suck-back mechanism unit are operated by the operation of one switching valve, for example, the suckback valve may have a configuration in which the suckback valve is provided with a valve main body, an opening/closing valve unit, and a suck-back mechanism unit, and the valve main body is formed with a fluid passage including an inlet flow passage and an outlet flow passage, a valve chamber to which the inlet flow passage opens, and a suck-back chamber located between the valve chamber and the outlet flow passage.

In the opening/closing valve unit, there is a piston which is moved by supplying and discharging a drive fluid to and from a cylinder chamber accommodating the piston to thereby bring a valve element interlocking with the piston into contact with and away from a valve seat formed around an opening from the inlet flow passage in the valve chamber. There is arranged in the cylinder chamber a biasing spring which biases the piston in a direction to press the valve element against the valve seat. In the opening/closing valve unit having such a configuration, the drive fluid is supplied to the cylinder chamber to cause a force due to the pressure of the drive fluid in the cylinder chamber to move the piston against a biasing force of the biasing spring, thereby separating the valve element from the valve seat. Further, by discharging the drive fluid from the cylinder chamber, the biasing force by the biasing spring exceeds the force due to the pressure of the drive fluid in the cylinder chamber and moves the piston in the direction to bring the valve element closer to the valve seat, thereby pressing the valve element against the valve seat. The opening and closing of the fluid passage are performed in this way.

In the suck-back mechanism unit, there is a piston which is moved by supplying and discharging the drive fluid to and from a cylinder chamber accommodating the piston to thereby deform a diaphragm facing the suck-back chamber in conjunction with the piston and increase or decrease the volume of the suck-back chamber. There is arranged in the cylinder chamber a biasing spring which biases the piston in the direction to separate from the suck-back chamber. In the suck-back mechanism unit configured in this way, by supplying the drive fluid to the cylinder chamber, the force due to the pressure of the drive fluid in the cylinder chamber moves the piston against the biasing force of the biasing spring to expand the diaphragm toward the suck-back chamber, thereby putting the diaphragm on standby. Further, by discharging the drive fluid from the cylinder chamber, the biasing force of the biasing spring exceeds the force due to the pressure of the drive fluid in the cylinder chamber and moves the piston in the direction to retract the diaphragm from the suck-back chamber, thereby causing the diaphragm to return to its original shape. The increase or decrease in the volume of the suck-back chamber associated with such deformation of the diaphragm causes the liquid in the fluid passage (specifically, the outlet flow passage) to be sucked back.

In the suckback valve having such a configuration as described above, when the drive fluid is supplied from the switching valve to the cylinder chambers of the opening/closing valve unit and the suck-back mechanism unit, the valve element is separated from the valve seat by the opening/closing valve unit, so that the flow of the liquid in the fluid passage is started and the diaphragm is caused to expand into the suck-back chamber by the suck-back mechanism unit and enters a standby state. On the other hand, when the drive fluid in the cylinder chambers of the opening/closing valve unit and the suck-back mechanism unit is discharged through the switching valve, the valve element is pressed against the valve seat by the opening/closing valve unit to close off the flow of the liquid in the fluid passage and the diaphragm is retracted from the suck-back chamber by the suck-back mechanism unit to increase the volume of the suck-back chamber, so that the liquid in the fluid passage (specifically, the outlet flow passage) is sucked back.

CITATION LIST

Patent Literatures

PTL1: Japanese Examined Utility Model Publication No. H08-010399
PTL2: Japanese Unexamined Utility Model Publication No. H3-115267

PTL3: Japanese Unexamined Patent Publication No. H11-
37327

SUMMARY OF THE INVENTION

Technical Problem

In order to perform closing by the opening/closing valve
unit, there is a need to switch the switching valve so as to
discharge the drive fluid from the opening/closing valve unit
as described above. In the case where the supply and
discharge of the drive fluid to and from the opening/closing
valve unit and the suck-back mechanism unit are switched
by the common switching valve, the discharge of the drive
fluid from the suck-back mechanism unit is also started
simultaneously by switching the common switching valve
so as to discharge the drive fluid from the opening/closing
valve unit. However, even if the discharge of the drive fluid
from the opening/closing valve unit is started, the opening/
closing valve unit does not immediately enter a valve closed
state. In order for the opening/closing valve unit to enter the
valve closed state, there is a need to reduce the pressure of
the drive fluid in the cylinder chamber of the opening/
closing valve unit to a predetermined value and bring the
valve element into contact with the valve seat by the biasing
force of the biasing spring. Thus, the suck-back operation by
the suck-back mechanism unit can be sometimes started
before the flow of the fluid is closed off by the opening/
closing valve unit. In this case, since this affects the amount
of liquid supplied to the downstream side of the suckback
valve, inconvenience occurs when precise control of the
amount of supply of liquid is required in the manufacture of
semiconductors and the like.

As a method of changing the timing so that the suck-back
operation by the suck-back mechanism unit is started after
the flow of the liquid is closed off by the opening/closing
valve unit, it is common to arrange a variable throttle valve
between the switching valve and the suck-back mechanism
unit to adjust the discharge flow rate of the drive fluid from
the suck-back mechanism unit. However, it is not easy to
adjust the variable throttle valve so that the suck-back
operation by the suck-back mechanism unit is started after
the flow of the liquid is closed off by the opening/closing
valve unit. Therefore, it is desirable to be able to supply the
drive fluid to the suck-back mechanism unit regardless of the
pressure of the opening/closing valve unit and start discharg-
ing the drive fluid from the suck-back mechanism unit after
the pressure of the drive fluid in the cylinder chamber of the
opening/closing valve unit is reduced to a predetermined
value. As a method of controlling the timing of discharging
the drive fluid from the suck-back mechanism unit, it is also
conceivable to use a pilot valve capable of performing valve
opening/closing on the base of a pressure of a pilot fluid.
However, since a general pilot valve has a mechanism in
which it closes when the pressure of the pilot fluid is
lowered, it is not possible to start the flow of the fluid when
the pressure of the drive fluid drops in the case where the
pressure thereof is synchronized with the pressure of the
drive fluid in the opening/closing valve unit, and the control
of the pilot fluid for opening and closing the pilot valve is
required separately, which complicates the control.

Accordingly, it is an object of the present invention is to
solve the problems existing in the prior art and to provide a
timing adjustment valve which can allow a fluid to flow
when the pressure of a pilot fluid is reduced to a predeter-
mined value or less.

Solution to Problem

In view of the above-described object, the present inven-
tion provides, as a first aspect thereof, a timing adjustment
valve including: a pilot body provided with a first port, a
second port, and a drive port and formed with an internal
flow passage extending between the first port and the second
port; a check valve mechanism which allows a fluid in the
internal flow passage to flow from the first port to the second
port and prevents the fluid in the internal flow passage from
flowing from the second port to the first port; and a timing
adjustment mechanism which opens and closes the internal
flow passage by supplying and discharging a drive fluid to
and from the drive port, in which the timing adjustment
mechanism is arranged in parallel with the check valve
mechanism in the internal flow passage and is configured to
allow the fluid to flow between the first port and the second
port when the pressure of the drive fluid supplied to and
discharged from the timing adjustment mechanism through
the drive port is equal to or less than a predetermined value.

In the above-described timing adjustment valve, the check
valve mechanism which allows the fluid in the internal flow
passage to flow from the first port to the second port while
it prevents the fluid in the internal flow passage from flowing
from the second port to the first port, and the timing
adjustment mechanism which opens and closes the internal
flow passage by supplying and discharging the drive fluid to
and from the drive port are arranged in parallel in the
internal flow passage extending between the first port and
the second port. Therefore, the check valve mechanism
enables the fluid to flow from the first port to the second port
regardless of the pressure of the drive fluid in the timing
adjustment mechanism. On the other hand, the flow of the
fluid from the second port to the first port is started when the
pressure of the drive fluid supplied to and discharged from
the timing adjustment mechanism through the drive port
becomes the predetermined value or less, and the timing to
start the flow of the fluid in the direction from the second
port to the first port can be controlled.

In one embodiment of the above timing adjustment valve,
the pilot body is formed therein with: a pilot cylinder
chamber being in communication with the drive port; a pilot
valve chamber being in communication with the second
port; a connection hole connecting the pilot cylinder cham-
ber and the pilot valve chamber to each other; a first flow
passage extending from the pilot valve chamber to the first
port; and a second flow passage extending parallel to the first
flow passage and being in communication with the first port
and the second port, and the first flow passage is provided on
a peripheral edge of an opening thereof to the pilot valve
chamber with a pilot valve seat, in which the check valve
mechanism is arranged between the second port and the
second flow passage to prevent the fluid from flowing from
the second port to the second flow passage and allow the
fluid to flow from the second flow passage to the second
port, and the timing adjustment mechanism includes a pilot
piston arranged in the pilot cylinder chamber, a pilot rod
extending from the pilot piston and inserted through the
connection hole, a pilot valve element portion provided at a
tip end of the pilot rod and arranged opposite to the pilot
valve seat in the pilot valve chamber, a plug member having
a flow hole extending through the plug member and attached
to an end of the first flow passage connected to the first port,
and a pilot biasing member biasing the pilot piston in a
direction to separate the pilot valve element portion from the
pilot valve seat, and is configured to press the pilot valve
element portion against the pilot valve seat against the biasing force by the pilot biasing member by supplying the drive fluid to the pilot cylinder chamber through the drive port to close off the flow of the fluid in the first flow passage.

In the above-described timing adjustment valve, the first flow passage and the second flow passage extend in parallel between the first port and the second port. The pilot piston in the pilot cylinder chamber of the timing adjustment mechanism is biased by the pilot biasing member in the direction to separate the pilot valve element portion from the pilot valve seat, and the drive fluid is supplied to the pilot cylinder chamber to move the pilot piston against the biasing force of the pilot biasing member, so that the pilot valve element portion is pressed against the pilot valve seat to close off the flow of the fluid in the first flow passage. Therefore, when the pressure of the drive fluid in the pilot cylinder chamber of the timing adjustment mechanism is lowered, the pilot valve element portion is separated from the pilot valve seat by the biasing force of the pilot biasing member, so that the flow of the fluid in the first flow passage is started. Further, the check valve mechanism is arranged between the second port and the second flow passage to prevent the fluid from flowing from the second port to the second flow passage and to allow the flow of the fluid from the second flow passage to the second port. Therefore, the flow of the fluid is ensured at least from the first port to the second port through the first port to the second flow passage. On the other hand, regarding the flow from the second port to the first port, the flow of the fluid from the second port to the second flow passage is prevented by the check valve mechanism, and the flow of the fluid from the second port to the first port through the pilot valve chamber and the first flow passage is ensured only when the pressure of the drive fluid in the pilot cylinder chamber of the timing adjustment mechanism is lowered.

It is preferable that the pilot biasing member is arranged to be sandwiched between the pilot valve element portion and the plug member.

In this case, it is more preferable that the plug member is screwed to the end of the first flow passage, so that the position of the plug member in the first flow passage can be adjusted by rotating the plug member.

The pilot body is constituted by a first pilot housing and a second pilot housing, the first pilot housing provided with the drive port, the pilot cylinder chamber, the connection hole, the pilot valve chamber, and the first flow passage, the second pilot housing provided with an insertion hole extending through the second pilot housing, a second flow passage extending parallel to the insertion hole, and the first port and the second port, the first pilot housing inserted into the insertion hole of the second pilot housing so that the second flow passage is in communication with a clearance passage formed between an inner peripheral surface of the insertion hole and an outer peripheral surface of the first pilot housing, the second port and the pilot valve chamber being in communication with each other by a communication passage extending across the first pilot housing and the second pilot housing, the clearance passage connected to the communication passage, the check valve mechanism arranged in the clearance passage.

It is preferable that the check valve mechanism is a lip packing arranged between the inner peripheral surface of the insertion hole and the outer peripheral surface of the first pilot housing and having a flexible lip structure part, the lip packing arranged so that the lip structure part is positioned on the side closer to the communication passage. For example, the lip packing is selected from a U packing, a V packing, and a Y packing.

The present invention provides, as a second aspect thereof, a suckback valve including: an opening/closing valve unit opening and closing a fluid passage; a suck-back mechanism unit arranged downstream of the opening/closing valve unit and sucking back the fluid in the fluid passage after the fluid passage is closed by the opening/closing valve unit; and the above-described timing adjustment valve, in which the opening/closing valve unit and the suck-back mechanism unit are connected to a common switching valve, the switching valve configured to supply and discharge the drive fluid to and from the opening/closing valve unit and the suck-back mechanism unit through the switching valve, the opening/closing valve unit being opened and the suck-back mechanism unit entering a standby state when the supply of the drive fluid through the switching valve is performed, the opening/closing valve unit being closed and the suck-back mechanism unit performing a suck-back operation when the discharge of the drive fluid through the switching valve is performed, the first port and the second port of the timing adjustment valve respectively connected to the switching valve and the suck-back mechanism unit, the drive port of the timing adjustment valve connected to piping between the switching valve and the opening/closing valve unit.

In the above suckback valve, the opening/closing valve unit opening and closing the fluid passage and the suck-back mechanism unit sucking back the fluid in the fluid passage are connected to the common switching valve, so that the supply and discharge of the drive fluid to and from the opening/closing valve unit and the suck-back mechanism unit are performed through the switching valve. Further, the first port and the second port of the above-described timing adjustment valve are respectively connected to the switching valve and the suck-back mechanism unit, and the drive port of the timing adjustment valve is connected to the piping between the switching valve and the opening/closing valve unit. Therefore, the pressure of the drive fluid supplied to and discharged from the pilot cylinder chamber through the drive port of the timing adjustment valve is equal to the pressure in the opening/closing valve unit. When the pressure of the drive fluid in the opening/closing valve unit is reduced to a predetermined value or less by discharging the drive fluid from the opening/closing valve unit through the switching valve, the drive fluid is allowed to flow from the second port to the first port in the timing adjustment valve so that the discharge of the drive fluid from the suck-back mechanism unit can be started. If the timing adjustment valve is set so that the opening/closing valve unit enters the valve closed state when the pressure of the drive fluid in the opening/closing value unit becomes equal to or less than the predetermined value, the timing adjustment valve makes it possible for the suck-back mechanism unit to start the suck-back operation after the flow of the fluid is closed off by the opening/closing valve unit.

In one embodiment, the above suckback valve further includes a valve main body provided with an internal flow passage for a fluid to flow therethrough, including an inlet flow passage and an outlet flow passage, and a suck-back chamber being in communication with the outlet flow passage, the fluid sucked back from the outlet flow passage by using the suck-back mechanism unit to increase the volume of the suck-back chamber after the flow of the fluid in the internal flow passage is closed off by the opening/closing valve unit, in which the suck-back mechanism unit includes a suck-back drive unit housing having a suck-back cylinder chamber formed therein, a suck-back piston accommodated in the suck-back cylinder chamber and being slidable along an inner peripheral surface of the suck-back cylinder chamber, and a suck-back biasing member being arranged in the suck-back cylinder chamber and biasing the suck-back piston in a direction to increase the volume of the suck-back chamber, the suck-back piston configured to be moved in a direction to decrease the volume of the suck-back chamber against a biasing force of the suck-back biasing member by supplying the drive fluid to the suck-back cylinder chamber.

Further, the suck-back mechanism unit may further include a diaphragm having an outer peripheral edge sandwiched between the suck-back drive unit housing and the valve main body, and a suck-back stem extending from the suck-back piston and inserted through a through hole formed in a bottom portion of the suck-back cylinder chamber, the diaphragm partitioning the suck-back drive unit housing and the suck-back chamber from each other, the diaphragm connected to a tip end of the suck-back stem so that the volume of the suck-back chamber is increased or decreased by deformation of the diaphragm accompanying movement of the suck-back piston.

In addition, the valve main body may be provided with a valve chamber which is in communication with the inlet flow passage and is in communication with the suck-back chamber via a communication passage, the valve chamber having a valve seat which a valve element is brought into contact with and away from, the valve seat formed in a peripheral edge of an opening from the inlet flow passage to the valve chamber, in which the opening/closing valve unit includes an opening/closing drive unit housing having an opening/closing cylinder chamber formed therein, an opening/closing piston accommodated in the opening/closing cylinder chamber and being slidable along an inner peripheral surface of the opening/closing cylinder chamber, an opening/closing stem extending from the opening/closing piston so as to penetrate a bottom portion of the opening/closing cylinder chamber and protrude into the valve chamber, and an opening/closing biasing member biasing the opening/closing piston in a direction to cause the valve element connected to a tip end of the opening/closing stem to approach the valve seat, and is configured to move the opening/closing piston in a direction to separate the valve element from the valve seat against a biasing force of the opening/closing biasing member by supplying the drive fluid to the opening/closing cylinder chamber.

Advantageous Effect of the Invention

In the timing adjustment valve according to the present invention, the check valve mechanism enables the fluid to flow from the first port to the second port regardless of the pressure of the drive fluid in the timing adjustment mechanism. Further, the check valve mechanism does not allow the drive fluid to flow from the second port to the first port, while the timing adjustment mechanism allows the fluid to start flowing from the second port to the first port when the pressure of the drive fluid supplied to and discharged from the timing adjustment mechanism through the drive port becomes equal to or less than the predetermined value. Therefore, the timing adjustment valve makes it possible to control the timing to start flowing of the fluid in the direction from the second port to the first port. In the suckback valve in which the opening/closing valve unit opening and closing the fluid passage and the suck-back mechanism unit sucking back the fluid in the fluid passage are connected to the common switching valve so that the supply and discharge of the drive fluid to and from the opening/closing valve unit and the suck-back mechanism unit are performed through the switching valve, the first port and the second port of the timing adjustment valve are respectively connected to the switching valve and the suck-back mechanism unit, and the drive port of the timing adjustment valve is connected to the piping between the switching valve and the opening/closing valve unit. In this case, if the opening/closing valve unit is set to enter the valve closed state when the pressure of the drive fluid in the pilot cylinder chamber of the opening/closing valve unit becomes equal to or less than the predetermined value, it is possible for the suck-back mechanism unit to start the such-back operation quickly after the flow of the fluid is closed off by the opening/closing valve unit. Further, when the drive fluid is supplied to the suck-back mechanism unit, the fluid can flow through the check valve mechanism in addition to the timing adjustment mechanism in the timing adjustment valve. Therefore, it is possible to supply the drive fluid to the suck-back mechanism unit at a large flow rate compared to when discharging from the suck-back mechanism unit.

DESCRIPTION OF EMBODIMENTS

Figure 1:
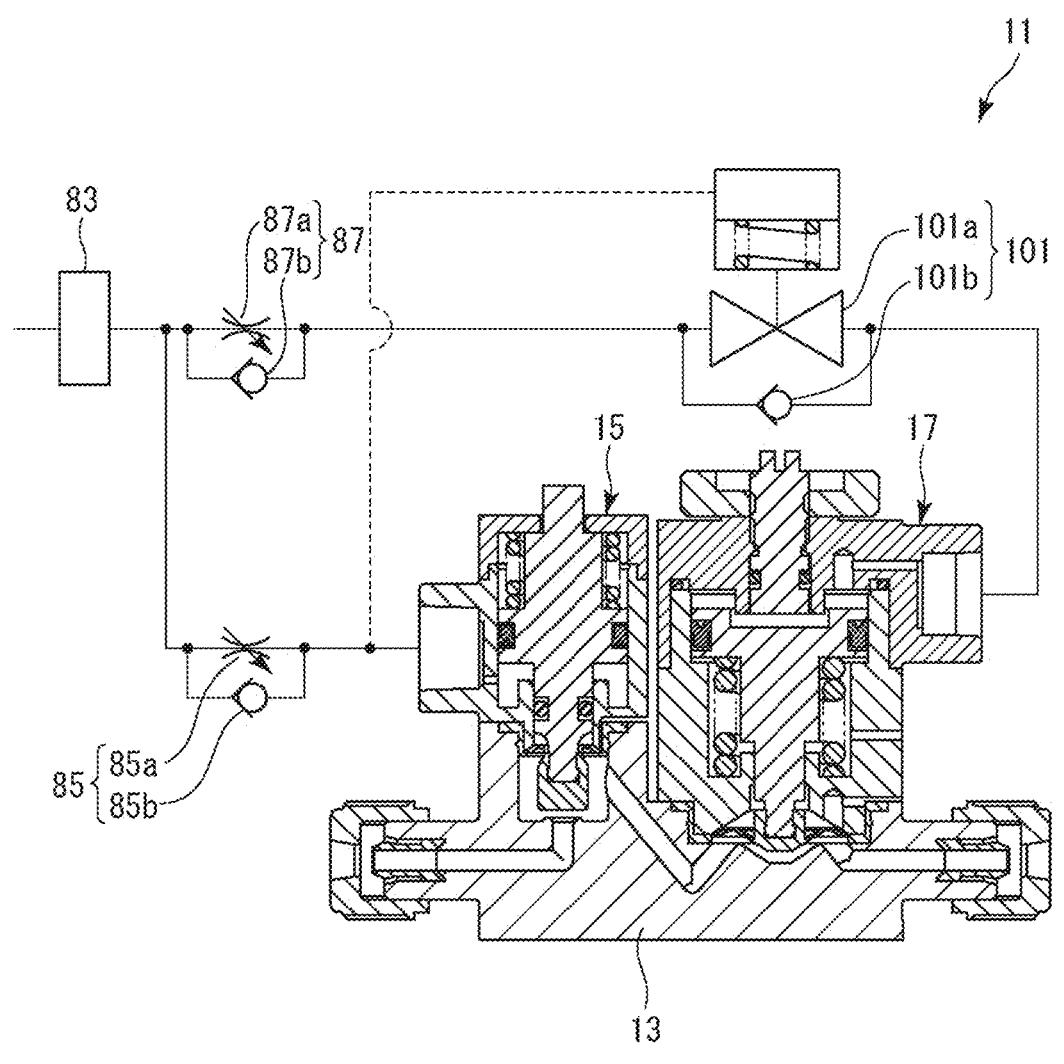
FIG. 1 is a conceptual view showing a concept of an overall configuration of a timing adjustment valve and a suckback valve provided with the same according to the present invention.

While embodiments of a timing adjustment valve according to the present invention and a suckback valve provided with the same will be described below with reference to the drawings, it goes without saying that the present invention is not limited to the shown embodiments.

First, an overall configuration of a suckback valve 11 according to one embodiment of the present invention will be described with reference to FIG. 1. The suckback valve 11 includes a valve main body 13 provided with a fluid passage, an opening/closing valve unit 15 which opens and closes the fluid passage, a suck-back mechanism unit 17 which sucks back the fluid in the flow passage, a switching valve 83 connected to both the opening/closing valve unit 15 and the suck-back mechanism unit 17 via branched pipes, and a timing adjustment valve 101 arranged on a pipe connecting between the suck-back mechanism unit 17 and the switching valve 83. The opening/closing valve unit 15 and the suck-back mechanism unit 17 are attached to the upper portion of the valve main body 13. The suck-back mechanism unit 17 is arranged downstream of the opening/closing valve unit 15. After the fluid passage is closed by the opening/closing valve unit 15 to shut off the flow of the fluid, the suck-back mechanism unit 17 sucks back the fluid in the fluid passage to make it possible to prevent the fluid from leaking and dripping out of a nozzle at the end of the fluid passage. Preferably, there are provided variable throttle valves 85 and 87 with check valves, on pipes between the switching valve 83 and the opening/closing valve unit 15 and between the switching valve 83 and the timing adjustment valve 101, respectively.

The opening/closing valve unit 15 is supplied with the drive fluid from a drive fluid source, not shown, through the switching valve 83 in order to bring the opening/closing valve unit 15 into a valve opened state. On the other hand, in order to bring the opening/closing valve unit 15 into a valve closed state, the switching valve 83 is switched so that the drive fluid is discharged through the switching valve 83. Further, the suck-back mechanism unit 17 enters a standby state when the drive fluid is supplied from the drive fluid source through the switching valve 83. On the other hand, when the switching valve 83 is switched to discharge the drive fluid through the switching valve 83, the suck-back mechanism unit 17 performs a suck-back operation to suck back the fluid from the inside of the fluid passage. That is, when the switching valve 83 is switched so that the drive fluid is supplied through the switching valve 83, the suck-back mechanism unit 17 enters the standby state in synchronism with when the opening/closing valve unit 15 is brought into the valve opened state. On the other hand, when the switching valve 83 is switched so that the drive fluid is discharged through the switching valve 83, the suck-back mechanism unit 17 starts the suck-back operation in synchronism with when the opening/closing valve unit 15 is brought into the valve closed state.

The timing adjustment valve 101 includes a timing adjustment mechanism 101*a* and a check valve mechanism 101*b* which are arranged in parallel on a flow passage. The check valve mechanism 101*b* is connected to the switching valve 83 and the suck-back mechanism unit 17 through pipes, and is configured to allow the drive fluid to flow from the switching valve 83 to the suck-back mechanism unit 17 and prevent the flow of the drive fluid from the suck-back mechanism unit 17 to the switching valve 83. The timing adjustment mechanism 101*a* is a kind of pilot valve which performs opening and closing operations by using a pilot fluid. The timing adjustment mechanism 101*a* is connected between the switching valve 83 and the suck-back mechanism unit 17 via the pipe and also connected to a pipe which connects between the switching valve 83 and the opening/closing valve unit 15, so that the timing adjustment mechanism 101*a* performs opening and closing operations using the drive fluid in the pipe as the pilot fluid to switch the flow and closing of the fluid between the switching valve 83 and the suck-back mechanism unit 17. Further, the timing adjustment mechanism 101*a* is configured to enter the valve opened state when the pressure of the drive fluid supplied and discharged, as the pilot fluid, to and from the pipe connecting between the switching valve 83 and the opening/closing valve unit 15 becomes equal to or less than a predetermined value (the pressure of the drive fluid in the opening/closing valve unit 15 when the opening/closing valve unit 15 is brought into the valve closed state), thereby allowing the flow of the drive fluid between the switching valve 83 and the suck-back mechanism unit 17. That is, the timing adjustment mechanism 101*a* substantially allows the flow of the drive fluid when the opening/closing valve unit 15 is in the valve closed state, and prevents the drive fluid from flowing when the opening/closing valve unit 15 is in the valve opened state.

Therefore, when the switching valve 83 is switched so that the drive fluid is supplied, the drive fluid is supplied to the opening/closing valve unit 15 to increase the pressure of the drive fluid in the opening/closing valve unit 15, so that the opening/closing valve unit 15 changes from the valve closed state to the valve opened state. As a result, the timing adjustment valve 101 supplies the drive fluid to the suck-back mechanism unit 17 through both the timing adjustment mechanism 101*a* and the check valve mechanism 101*b*. On the other hand, when the switching valve 83 is switched so that the drive fluid is discharged, the drive fluid is discharged from the opening/closing valve unit 15 to reduce the pressure of the drive fluid in the opening/closing valve unit 15, so that the opening/closing valve unit 15 changes from the valve opened state to the valve closed state. Thus, since the timing adjustment valve 101 does not allow the drive fluid to flow through both the timing adjustment mechanism 101*a* and the check valve mechanism 101*b* until the opening/closing valve unit 15 is brought into the valve closed state, the timing adjustment valve 101 does not allow the drive fluid to be discharged from the suck-back mechanism unit 17. Since the timing adjustment mechanism 101*a* allows the flow of the drive fluid after the opening/closing valve unit 15 is brought into the valve closed state, the timing adjustment valve 101 allows the drive fluid to be discharged from the suck-back mechanism unit 17 only through the timing adjustment mechanism 101*a*. Thus, the timing adjustment valve 101 enables the suck-back mechanism unit 17 to perform the suck-back operation after the opening/closing valve unit 15 is brought into the valve closed state.

Further, when the drive fluid is supplied to the suck-back mechanism unit 17, the timing adjustment valve 101 causes the drive fluid to flow to the suck-back mechanism unit 17 through both the timing adjustment mechanism 101*a* and the check valve mechanism 101*b*. Therefore, the timing adjustment valve 101 allows a larger flow rate of drive fluid than when the drive fluid is discharged from the suck-back mechanism unit 17 to flow, and can quickly return the suck-back mechanism unit 17 to the standby state.

Incidentally, the variable throttle valve 85 with the check valve includes a variable throttle valve portion 85*a* and a check valve portion 85*b* which are arranged in parallel on the flow passages. The variable throttle valve 87 with the check valve also similarly includes a variable throttle valve portion 87*a* and a check valve portion 87*b* arranged in parallel on the flow passages. The variable throttle valve portion 85*a* can adjust and change the flow rate of the drive fluid passing therethrough. By adjusting the flow rates when the drive fluid is supplied to and discharged from the opening/closing valve unit 15, it is possible to adjust the timings of the start and completion of opening and closing operations and the speed of the opening and closing operations. Similarly, the variable throttle valve portion 87*a* can adjust and change the flow rate of the drive fluid passing therethrough. By adjusting the flow rates when the drive fluid is supplied to and discharged from the suck-back mechanism unit 17, it is possible to adjust the timings of the start and completion of the suck-back operation and the speed of the opening and closing operations. Further, the check valve portions 85*b* and 87*b* allow the drive fluid to flow therethrough in the direction of supplying the drive fluid from the drive fluid source to the opening/closing valve unit 15 and the suck-back mechanism unit 17, while the check valve portions 85*b* and 87*b* prevent the drive fluid from flowing therethrough in the direction of discharging the drive fluid from the opening/closing valve unit 15 and the suck-back mechanism unit 17 to the outside. Thus, it is possible to quickly perform the returning of the opening/ closing valve unit 15 to the valve opened state and the returning of the suck-back mechanism unit 17 to the standby state.

Next, a specific configuration of the suck-back valve 11 will be described with reference to FIGS. 2 to 4.

Figure 2:
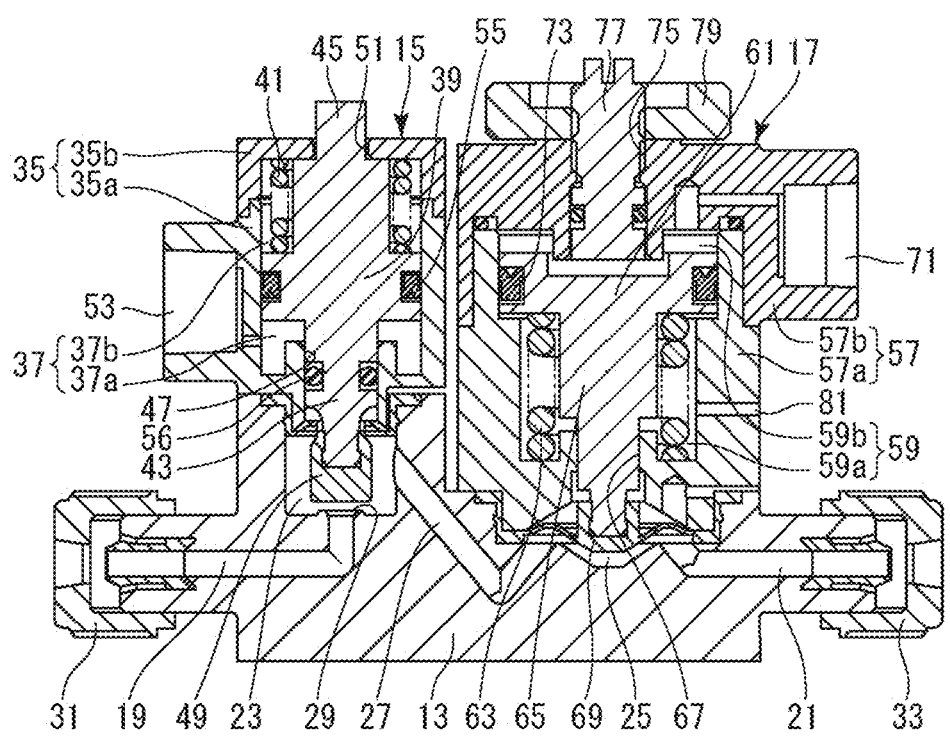
FIG. 2 is a vertical cross-sectional view showing configurations of a valve main body, an opening/closing valve unit, and a suckback mechanism unit of the suckback valve shown in FIG. 1.

FIG. 2 shows the details of the configurations of the valve main body 13, the opening/closing valve unit 15, and the suck-back mechanism unit 17 of the suck-back valve 11 shown in FIG. 1.

The fluid passage including an inlet flow passage 19 and an outlet flow passage 21 is formed in the valve main body 13. Further, there is provided downstream of the inlet flow passage 19 a valve chamber 23 which opens upward, and there is provided upstream of the outlet flow passage 21 a suck-back chamber 25 which opens upward. The valve chamber 23 and the suck-back chamber 25 are connected between each other by a communication passage 27. In the valve main body 13 configured in this way, the fluid supplied to the inlet flow passage 19 is discharged from the outlet flow passage 21 through the valve chamber 23, the communication passage 27, and the suck-back chamber 25. In the shown embodiment, the inlet flow passage 19 opens into a bottom surface of the valve chamber 23, and the outlet flow passage 21 opens into a bottom surface of the suck-back chamber 25. Also, the communication passage 27 opens into a side surface of the valve chamber 23 and the bottom surface of the suck-back chamber 25. There is formed around the opening of the inlet flow passage 19 into the valve chamber 23 an annular valve seat 29 which a valve element 49, described later, is brought into contact with and away from. Further, joints 31 and 33 for connecting piping such as tubes are provided at an upstream end of the inlet flow passage 19 and a downstream end of the outlet flow passage 21, respectively. However, as long as the fluid having flowed into the inlet flow passage 19 is discharged from the outlet flow passage 21 via the valve chamber 23, the communication passage 27, and the suck-back chamber 25, the fluid passage will not be limited to the configuration shown in the figure.

The opening/closing valve unit 15 includes an opening/ closing drive unit housing 35 having an opening/closing cylinder chamber 37 formed therein, an opening/closing piston 39 accommodated in the opening/closing cylinder chamber 37, and an opening/closing biasing member 41 biasing the opening/closing piston 39. The opening/closing drive unit housing 35 is constituted by an opening/closing bonnet 35a formed therein with an accommodation space of a circular cross section and a substantially cylindrical shape, and an opening/closing lid member 35b attached to the top of the opening/closing bonnet 35a to close an opening at the top of the opening/closing bonnet 35a. The opening/closing cylinder chamber 37 is formed by a space surrounded by an inner peripheral surface and a bottom surface of the accommodation space of the opening/closing bonnet 35a and a bottom surface of the opening/closing lid member 35b. The opening/closing piston 39 has a substantially disk shape and is accommodated in the opening/closing cylinder chamber 37 so as to be vertically slidable in the figure along the peripheral wall thereof (i.e., the inner peripheral surface thereof). The opening/closing cylinder chamber 37 is divided into a first fluid chamber 37a which is surrounded by the opening/closing piston 39 (specifically, the bottom surface thereof), the inner peripheral surface of the opening/ closing cylinder chamber 37 (specifically, the opening/clos- ing bonnet 35a), and the bottom surface of the opening/ closing cylinder chamber 37 (i.e., a bottom portion of the opening/closing bonnet 35a) and which is positioned on the side close to the valve chamber 23, and a second fluid chamber 37b which is surrounded by the opening/closing piston 39 (specifically, the top surface thereof), the inner peripheral surface of the opening/closing cylinder chamber 37 (specifically, the opening/closing bonnet 35a), and a ceiling surface of the opening/closing cylinder chamber 37 (i.e., the bottom surface of the opening/closing lid member 35b) and which is positioned on the side far from the valve chamber 23. In the embodiment shown in FIG. 2, the first fluid chamber 37a is positioned below the opening/closing piston 39, and the second fluid chamber 37b is positioned above the opening/closing piston 39.

The opening/closing piston 39 is connected to an opening/ closing stem 43 which is thinner than the opening/closing piston 39 and extends downward in the figure in a direction to approach the valve chamber 23, and is connected to a guide shaft 45 which is thinner than the opening/closing piston 39 and extends upward in the figure in a direction away from the valve chamber 23, i.e., in the opposite direction to the opening/closing stem 43. The opening/ closing stem 43 is slidably inserted through a through hole 47 formed to extend through the bottom portion of the opening/closing cylinder chamber 37 (specifically, the open- ing/closing bonnet 35a) of the opening/closing drive unit housing 35 and extends into the valve chamber 23, and a valve element 49 is connected to the tip end of the opening/ closing stem 43. The valve element 49 has a shape in which a truncated cone is connected onto a cylinder, and is arranged so that the bottom surface thereof faces the valve seat 29. The guide shaft 45 is inserted through a through hole 51 formed to extend through the opening/closing lid member 35b and extends to the outside, and is configured to guide the reciprocating motion of the opening/closing piston 39. The valve element 49 can open and close the fluid passage by being brought in contact with and away from the valve seat 29 formed in the valve chamber 23 via the opening/closing stem 43 as the opening/closing piston 39 reciprocates ver- tically in the opening/closing cylinder chamber 37.

The opening/closing biasing member 41 is arranged in a compressed state between the ceiling surface of the opening/ closing cylinder chamber 37 (i.e., the bottom surface of the opening/closing lid member 35b) and the opening/closing piston 39 (specifically, the top surface thereof) in the second fluid chamber 37b, so that the opening/closing biasing member 41 always biases the opening/closing piston 39 in a direction to cause the valve element 49 connected to the tip of the opening/closing stem 43 to approach toward the valve seat 29. In the embodiment shown in FIG. 2, a coil spring is used as the opening/closing biasing member 41, and the coil spring is arranged to spirally extend around the guide shaft 45 within the second fluid chamber 37b. However, as long as it is possible to bias the opening/closing piston 39 so as to cause the valve element 49 to approach toward the valve seat 29, the opening/closing biasing member 41 is not limited to the coil spring, and can also be, for example, a cylindrical elastic body or the like.

The opening/closing cylinder chamber 37 (specifically, the opening/closing bonnet 35a) has an opening/closing drive fluid port 53 provided on a peripheral wall thereof at a position not closed by the opening/closing piston 39. When the pressure of the drive fluid in the first fluid chamber 37a is increased by supplying the drive fluid to the first fluid chamber 37a through the opening/closing drive fluid port 53 in a state where the valve element 49 is pressed against the valve seat 29 by a biasing force of the opening/closing biasing member 41, the force acting on the opening/closing piston 39 due to the pressure of the drive fluid in the first fluid chamber 37a (hereinafter may be described as a "force due to the drive fluid") exceeds the force acting on the opening/closing piston 39 by the opening/closing biasing member 41 (hereinafter may be described as a "biasing force by the opening/closing biasing member 41"), so that the opening/closing piston 39 moves in a direction to separate from the valve chamber 23 against the biasing force by the opening/closing biasing member 41 to thereby increase the volume of the first fluid chamber 37a. Consequently, the valve element 49 connected to the opening/closing piston 39 via the opening/closing stem 43 is separated from the valve seat 29 to allow the start of the flow of the fluid in the fluid passage. When the pressure of the drive fluid in the first fluid chamber 37a becomes the maximum, the opening/closing piston 39 stops at the valve opening position. On the other hand, when the pressure of the drive fluid in the first fluid chamber 37a is reduced by discharging the drive fluid in the first fluid chamber 37a through the opening/closing drive fluid port 53 in a state where the valve element 49 is separated from the valve seat 29, the force due to the drive fluid falls below the biasing force by the opening/closing biasing member 41, so that the opening/closing piston 39 moves in a direction to approach the valve chamber 23 according to the biasing force by the opening/closing biasing member 41 to thereby reduce the volume of the first fluid chamber 37a. Consequently, the valve element 49 connected to the opening/closing piston 39 via the opening/closing stem 43 is pressed against the valve seat 29 so that the opening/closing piston 39 stops at the valve closing position, thereby making it possible to close off the flow of the fluid in the fluid passage. For example, compressed air or the like can be used as the drive fluid.

Incidentally, the air in the second fluid chamber 37b is released to the outside from a gap between an outer peripheral surface of the guide shaft 45 and an inner peripheral surface of the through hole 51 of the opening/closing lid member 35b. This makes it hard for the air in the second fluid to obstruct the sliding of the opening/closing piston 39 in the opening/closing cylinder chamber 37. Further, there is the seal member 55 attached to the outer peripheral surface of the opening/closing piston 39, so that the opening/closing piston 39 can slide on the inner peripheral surface of the opening/closing cylinder chamber 37 in a sealed state so as to prevent the drive fluid from leaking from the first fluid chamber 37a to the second fluid chamber 37b. There is also a seal member 56, such as an O-ring, attached to the outer peripheral surface of the opening/closing stem 43, so that the opening/closing stem 43 can slide on the inner peripheral surface of the through hole 47 in a sealed state so as to prevent the drive fluid from leaking out to the outside from the first fluid chamber 37a.

In the embodiment shown in FIG. 2, there is provided a thin film-like diaphragm portion 49a extending radially outward from an outer peripheral portion of an upper end of the valve element 49. The diaphragm portion 49a has an outer peripheral edge sandwiched between the valve main body 13 and the opening/closing bonnet 35a, and the valve element 49 is in a state of being supported in the valve chamber 23 via the diaphragm portion 49a. By taking the form of supporting the valve element 49 in the valve chamber 23 via the diaphragm portion 49a in this manner, the valve chamber 23 and the opening/closing drive unit housing 35 are partitioned from each other by the diaphragm portion 49a. Therefore, when the fluid flowing through the fluid passage is a corrosive fluid or the like, the fluid in the valve chamber 23 can be prevented from entering the opening/closing cylinder chamber 37 or the like and corroding the opening/closing drive unit housing 35 or the like.

The suck-back mechanism unit 17 includes a suck-back drive unit housing 57 having a suck-back cylinder chamber 59 formed therein, a suck-back piston 61 accommodated in the suck-back cylinder chamber 59, and a suck-back biasing member 63 biasing the suck-back piston 61. The suck-back drive unit housing 57 is constituted by a suck-back bonnet 57a formed therein with an accommodation space of a circular cross section and a substantially cylindrical shape, and a suck-back lid member 57b attached to the top of the suck-back bonnet 57a to close an opening at the top of the suck-back bonnet 57a. The suck-back cylinder chamber 59 is formed by a space surrounded by an inner peripheral surface and a bottom surface of the accommodation space of the suck-back bonnet 57a and a bottom surface of the suck-back lid member 57b. The suck-back piston 61 has a substantially disk shape and is accommodated in the suck-back cylinder chamber 59 so as to be vertically slidable in the figure along the peripheral wall thereof (i.e., the inner peripheral surface thereof). The suck-back cylinder chamber 59 is divided into a first fluid chamber 59a which is surrounded by the suck-back piston 61 (specifically, the bottom surface thereof), the inner peripheral surface of the suck-back cylinder chamber 59 (i.e., the suck-back bonnet 57a), and the bottom surface of the suck-back cylinder chamber 59 (i.e., a bottom portion of the suck-back bonnet 57a) and which is positioned on the side close to the suck-back chamber 25, and a second fluid chamber 59b which is surrounded by the suck-back piston 61 (specifically, the top surface thereof), the inner peripheral surface of the suck-back cylinder chamber 59 (i.e., the suck-back bonnet 57a), and a ceiling surface of the suck-back cylinder chamber 59 (i.e., the bottom surface of the suck-back lid member 57b) and which is positioned on the side far from the suck-back chamber 25. In the embodiment shown in FIG. 2, the first fluid chamber 59a is positioned below the suck-back piston 61 and the second fluid chamber 59b is positioned above the suck-back piston 61.

The suck-back piston 61 is connected to a suck-back stem 65 which is thinner than the suck-back piston 61 and extends downward in the figure in a direction to approach the suck-back chamber 25. The suck-back stem 65 is slidably inserted through a through hole 67 formed to extend through the bottom portion of the suck-back bonnet 57a of the suck-back drive unit housing 57 and extends into the suck-back chamber 25, and a diaphragm 69 is connected to the tip end of the suck-back stem 65. The diaphragm 69 has an outer peripheral edge sandwiched between the valve main body 13 and the suck-back bonnet 57a, and the diaphragm 69 partitions the suck-back chamber 25 and the suck-back drive unit housing 57 from each other. The diaphragm 69 configured in this manner expands or retracts with respect to the suck-back chamber via the suck-back stem 65 as the suck-back piston 61 reciprocates vertically in the suck-back cylinder chamber 59, thereby increasing or decreasing the volume of the suck-back chamber 25. Thus, by increasing the volume of the suck-back chamber 25, the fluid in the outlet flow passage 21 connected to the downstream side of the suck-back chamber 25 can be sucked back.

The suck-back biasing member 63 is arranged in a compressed state between the bottom portion of the suck-back cylinder chamber 59 (i.e., the bottom portion of the suck-back bonnet 57a) and the suck-back piston 61 (specifically, the bottom surface thereof) in the first fluid chamber 59a, so that the suck-back biasing member 63 always biases the suck-back piston 61 in a direction to cause the diaphragm 69 connected to the tip of the suck-back stem 65 to retract from the suck-back chamber 25 (i.e., separate from the valve main body 13). In the embodiment shown in FIG. 2, a coil spring is used as the suck-back biasing member 63, and the coil spring is arranged to spirally extend around the suck-back stem 65 within the first fluid chamber 59*a*. However, as long as it is possible to bias the suck-back piston 61 so as to cause the diaphragm 69 to retract from the suck-back chamber 25, the suck-back biasing member 63 is not limited to the coil spring, and can also be, for example, a cylindrical elastic body or the like.

The suck-back cylinder chamber 59 (specifically, the suck-back drive unit housing 57) has a suck-back drive fluid port 71 provided at a position not closed by the suck-back piston 61. In the shown embodiment, the suck-back drive fluid port 71 is provided in the suck-back lid member 57*b* of the suck-back drive unit housing 57 so as to open to the ceiling surface of the suck-back cylinder chamber 59. When the pressure of the drive fluid in the second fluid chamber 59*b* is increased by supplying the drive fluid to the second fluid chamber 59*b* through the suck-back drive fluid port 71 in a state where the diaphragm 69 is retracted from the suck-back chamber 25 by the biasing force of the suck-back biasing member 63, the force acting on the suck-back piston 61 due to the pressure of the drive fluid in the second fluid chamber 59*b* (hereinafter may be described as a "force due to the drive fluid") exceeds the force acting on the suck-back piston 61 by the suck-back biasing member 63 (hereinafter may be described as a "biasing force by the suck-back biasing member 63"), so that the suck-back piston 61 moves in a direction to approach the suck-back chamber 25 against the biasing force by the suck-back biasing member 63 to thereby increase the volume of the second fluid chamber 59*b*. Consequently, the diaphragm 69 connected to the suck-back piston 61 via the suck-back stem 65 expands into the suck-back chamber 25, and the suck-back piston 61 stops at the standby position when the pressure of the drive fluid in the second fluid chamber 59*b* reaches the maximum. On the other hand, when the pressure of the drive fluid in the second fluid chamber 59*b* is reduced by discharging the drive fluid in the second fluid chamber 59*b* through the suck-back drive fluid port 71 in a state where the suck-back piston 61 is at the standby position and the diaphragm 69 is expanded into the suck-back chamber 25, the force due to the drive fluid falls below the biasing force by the suck-back biasing member 63, so that the suck-back piston 61 moves in a direction to approach the suck-back chamber 25 according to the biasing force by the suck-back biasing member 63 to thereby reduce the volume of the second fluid chamber 59*b*. Consequently, the diaphragm 69 connected to the suck-back piston 61 via the suck-back stem 65 retracts from the suck-back chamber 25 to increase the volume of the suck-back chamber 25, thereby sucking back the fluid in the outlet flow passage 21 being in communication with the suck-back chamber 25. The suck-back operation is completed when the suck-back piston 61 reaches the suck-back position.

In the suck-back mechanism unit 17, the suck-back piston 61 is slidable between a top dead center position located on the upper side (the side farther from the suck-back chamber 25) and a bottom dead center position located on the lower side (the side closer to the suck-back chamber 25) in the suck-back cylinder chamber 59. A "dead center position" means a limit position of movement where the suck-back piston 61 is brought into contact with a specific portion of another member to restrict the movement thereof. In the shown embodiment, the suck-back cylinder chamber 59 includes a large diameter portion which accommodates the suck-back piston 61 and a small diameter portion smaller in diameter than the large diameter portion, and is provided with a stepped portion between the large diameter portion and the small diameter portion, so that the bottom dead center position of the suck-back piston 61 is defined by interference of the suck-back piston 61 with the stepped portion. Further, in the shown embodiment, the suck-back lid member 57*b* is formed, in the central portion thereof, with a through hole 75 which extends through the suck-back lid member 57*b* and has a thread groove on at least a portion of the inner peripheral surface thereof. There is an adjustment screw 77 screwed into the through hole 75 in a sealed state so as to be able to protrude from the ceiling portion of the suck-back cylinder chamber 59 into the second fluid chamber 59*b*. The adjustment screw 77 has a portion protruded outside from the suck-back lid member 57*b*, and a lock nut 79 is screwed to that portion, so that the rotation of the adjustment screw 77 can be locked by tightening the lock nut 79. When the adjustment screw 77 protrudes into the second fluid chamber 59*b*, the suck-back piston 61 (specifically, the top surface thereof) abuts against the adjustment screw 77 so that the movement thereof is restricted. When the adjustment screw 77 does not protrude into the second fluid chamber 59*b*, the suck-back piston 61 abuts against the ceiling portion (specifically, the bottom portion of the suck-back lid member 57*b*) of the suck-back cylinder chamber 59 so that the movement thereof is restricted. Thus, the top dead center position of the suck-back piston 61 is defined. That is, the suck-back position being the position of the suck-back piston 61 when the suck-back operation by the suck-back mechanism unit 17 is completed and the pressure of the drive fluid in the second fluid chamber 59*b* at that time can be adjusted by the adjustment screw 77.

Incidentally, there is a ventilation hole 81 provided at a peripheral wall of the small-diameter portion of the suck-back cylinder chamber 59, i.e., at a position which is not closed by the suck-back piston 61, to allow ventilation between the first fluid chamber 59*a* and the outside, so that the air in the first fluid chamber 59*a* may hardly obstruct the movement of the suck-back piston 61.

The opening/closing drive fluid port 53 of the opening/closing valve unit 15 and the suck-back drive fluid port 71 of the suck-back mechanism unit 17 are connected to a common switching valve 83 by branched piping and are connected to one common drive fluid source (not shown) via the switching valve 83. The switching valve 83 is capable of switching between the supply of drive fluid from the drive fluid source to the opening/closing drive fluid port 53 and the suck-back drive fluid port 71 and the discharge of the drive fluid from the opening/closing drive fluid port 53 and the suck-back drive fluid port 71 to the outside.

Further, in the suck-back mechanism unit 17, a lip packing is used as the seal member 73. Here, the lip packing is a packing having a flexible lip structure part in a sealing portion (pressure receiving portion) and refers to one which can appropriately maintain contact pressure on the seal surface by the lip structure part deforming and following the movement of the sliding surface and changes in pressure. The seal packing includes a J packing, an L packing, a U packing, a V packing, a Y packing, and the like. In the shown embodiment, the Y packing is used as the seal member 73. When the Y packing is used, branched lip structure parts of the Y packing are arranged toward the second fluid chamber 59*b*. This can enhance the function of preventing the drive fluid in the second fluid chamber 59*b* from leaking into the first fluid chamber 59*a*.

Incidentally, since the seal performance required between a movable member and a stationary member in the suck-back mechanism unit 17 is lower than that in the opening/closing valve unit 15, the seal member between the movable member and the stationary member is not provided except for the seal member 73 in the suck-back mechanism unit 17 and no seal member is attached to the outer peripheral surface of the suck-back stem 65. Further, even in the opening/closing valve unit 15, the lip packing may be used as the seal member 55 in the same way as the seal member 73, as shown in the embodiment.

Figure 3:
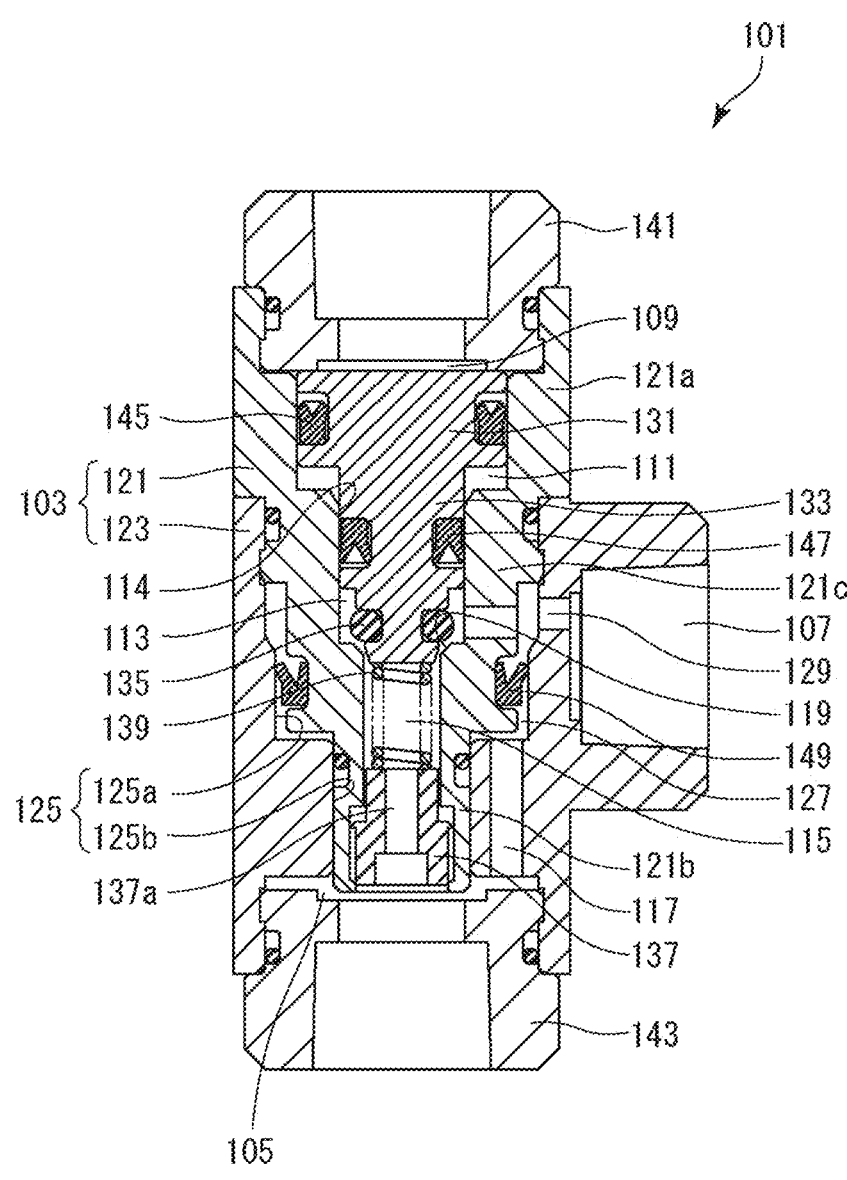
FIG. 3 is a vertical cross-sectional view showing a configuration of one embodiment of the timing adjustment valve of the suckback valve shown in FIG. 1 and illustrates a state in which a timing adjustment mechanism of the timing adjustment valve is opened.
Figure 4:
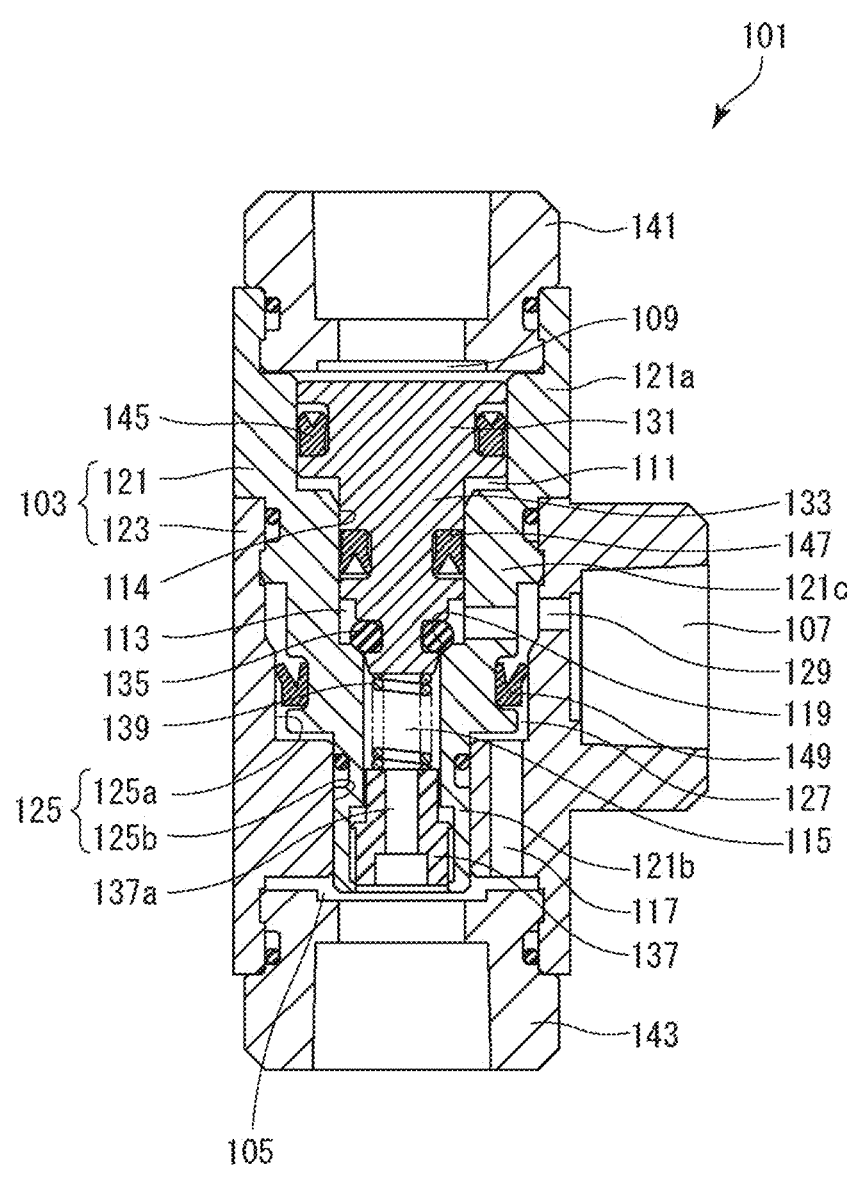
FIG. 4 is a vertical cross-sectional view showing a configuration of one embodiment of the timing adjustment valve of the suckback valve shown in FIG. 1 and illustrates a state in which the timing adjustment mechanism of the timing adjustment valve is closed.

FIGS. 3 and 4 show the configuration of one embodiment of the timing adjustment valve 101 of the suckback valve 11 shown in FIG. 1.

The timing adjustment valve 101 includes a pilot body 103 provided with a first port 105, a second port 107, and a drive port 109 and formed with an internal flow passage extending between the first port 105 and the second port 107, a timing adjustment mechanism 101a, and a check valve mechanism 101b, and the timing adjustment mechanism 101a and the check valve mechanism 101b are arranged in parallel on the internal flow passage. There are formed in the pilot body 103 a pilot cylinder chamber 111 being in communication with the drive port 109, a pilot valve chamber 113 being in communication with the second port 107, a connection hole 114 connecting the pilot cylinder chamber 111 and the pilot valve chamber 113, a first flow passage 115 extending between the pilot valve chamber 113 and the first port 105, and a second flow passage 117 extending parallel to the first flow passage 115 and being in communication with the first port 105 and the second port 107. The first flow passage 115 is provided on a peripheral edge of an opening thereof to the pilot valve chamber 113 with a pilot valve seat 119.

In the shown embodiment, the pilot body 103 is constituted by a first pilot housing 121 and a second pilot housing 123. The first pilot housing 121 includes an enlarged portion 121a, a reduced portion 121b thinner than the enlarged portion 121a, and an intermediate portion 121c which is provided between the enlarged portion 121a and the reduced portion 121b and which is thinner than the enlarged portion 121a and thicker than the reduced portion 121b. The first pilot housing 121 is provided with the drive port 109 which is provided at an end thereof and opens to the outside, the pilot cylinder chamber 111, the pilot valve chamber 113, and the first flow passage 115. The pilot cylinder chamber 111 opens to the drive port 109. In the shown embodiment, the drive port 109 is fitted with a first joint 141. The second pilot housing 123 is formed with the first port 105 and the second port 107, an insertion hole 125 extending therethrough, and the second flow passage 117 extending in parallel to the insertion hole 125. The insertion hole 125 includes an enlarged hole portion 125a, and a reduced hole portion 125b which is thinner than the enlarged hole portion 125a. The second port 107 is formed in a side portion of the second pilot housing 123 and is in communication with the enlarged hole portion 125a through a portion of a communication passage 129 described later.

By inserting the reduced portion 121b of the first pilot housing 121 into the reduced hole portion 125b of the insertion hole 125 of the second pilot housing 123 and inserting the intermediate portion 121c into the enlarged hole portion 125a, the first pilot housing 121 and the second pilot housing 123 are connected to each other in a state where the enlarged portion 121a is protruded from the insertion hole 125. In the state where the first pilot housing 121 is inserted into the insertion hole 125 of the second pilot housing 123, there is a clearance passage 127 formed between an outer peripheral surface of the intermediate portion 121c of the first pilot housing 121 and an inner peripheral surface of the enlarged hole portion 125a of the second pilot housing 123, so that the second flow passage 117 is in communication with the clearance passage 127. Further, the communication passage 129 is formed by a through hole extending from the pilot valve chamber 113 of the first pilot housing 121 through a side wall thereof and a through hole extending from the second port 107 of the second pilot housing 123 to the enlarged hole portion 125a of the insertion hole 125, so that the second port 107 and the pilot valve chamber 113 are in communication with each other via the communication passage 129. Further, the clearance passage 127 is connected to the communication passage 129.

The first port 105 is provided at the end of the second pilot housing 123 so as to be connected to both the reduced hole portion 125b of the insertion hole 125 and the second flow passage 117, and a second joint 143 is attached to the first port 105.

There is a pilot piston 131 accommodated in the pilot cylinder chamber 111. There is a pilot rod 133 extending from the pilot piston 131 so as to protrude into the pilot valve chamber 113 through the connection hole 114. The pilot rod 133 has a pilot valve element portion 135 provided at the tip end thereof which protrudes into the pilot valve chamber 113, and the pilot valve element portion 135 is arranged in the pilot valve chamber 113 so as to face the pilot valve seat 119. In the shown embodiment, the pilot valve element portion 135 is constituted by an O-ring attached to an outer peripheral surface of the tip end of the pilot rod 133, and closes off the flow of the fluid in the first flow passage 115 by pressing the O-ring against the pilot valve seat 119 formed at the peripheral edge of the opening from the first flow passage 115 to the pilot valve chamber 113. However, the configuration of the pilot valve element portion 135 is not limited as long as it can be seated on the pilot valve seat 119 to close off the flow of the fluid in the first flow passage 115. The pilot valve element portion 135 can also be, for example, a truncated cone-shaped elastic body fixed to the tip end of the pilot rod 133.

Incidentally, there are a seal member 145 and a seal member 147 attached to outer peripheral surfaces of the pilot piston 131 and the pilot rod 133, respectively, to seal between an inner peripheral surface of the pilot cylinder chamber 111 and an outer peripheral surface of the pilot piston 131 and between an inner peripheral surface of the connection hole 114 and the outer peripheral surface of the pilot rod 133.

There is a plug member 137 attached to the end of the first flow passage 115 of the pilot body 103 being in communication with the first port 105. The plug member 137 is formed with a flow hole 137a extending therethrough, so that the first port 105 and the first flow passage 115 are in communication with each other even in a state where the plug member 137 is attached to the end of the first flow passage 115. There is a pilot biasing member 139 arranged in a compressed state between a tip end of the pilot valve element portion 135 and the plug member 137 in the first flow passage 115, so that the pilot biasing member 139 always biases the pilot piston 131 in the direction of separating the pilot valve element portion 135 from the pilot valve seat 119 via the pilot rod 133. In the shown embodiment, a coil spring is used as the pilot biasing member 139. However, as long as the pilot piston 131 can always be biased in the direction of separating the pilot valve element portion 135 from the pilot valve seat 119 and the fluid can be allowed to pass therethrough, the pilot biasing member 139 is not limited to the coil spring, and can also be, for example, a cylindrical elastic body. As long as the pilot piston 131 can always be biased in the direction of separating the pilot valve element portion 135 from the pilot valve seat 119, the pilot biasing member 139 is not required to be arranged between the tip end of the pilot valve element portion 135 and the plug member 137, and may be arranged in the pilot cylinder chamber 111, for example.

There are threads provided at an outer peripheral surface of the plug member 137 and the end of the first flow passage 115 to which the plug member 137 is attached. The plug member 137 is preferably attached to the end of the first flow passage 115 by screwing. In the case where the plug member 137 is screwed into the first flow passage 115, the plug member 137 is rotated with respect to the first flow passage 115 to thereby enable the position of the plug member 137 in the first flow passage 115 to be adjusted.

With such a configuration, by supplying the drive fluid from the drive port 109 to the pilot cylinder chamber 111, the force due to the drive fluid can exceed the biasing force by the pilot biasing member 139 to cause the pilot piston 131 to move in the direction of approaching the pilot valve chamber 113 against the biasing force by the pilot biasing member 139. As a result, the pilot valve element portion 135 is brought into pressure contact with the pilot valve seat 119 via the pilot rod 133 to make it possible to close off the flow of the fluid in the first flow passage 115. Further, by discharging the drive fluid from the pilot cylinder chamber 111, the force due to the drive fluid can fall below the biasing force by the pilot biasing member 139 to cause the pilot piston 131 to move in the direction of separating from the pilot valve chamber 113 according to the biasing force by the pilot biasing member 139. As a result, the pilot valve element portion 135 is separated from the pilot valve seat 119 via the pilot rod 133, thereby allowing the fluid to flow between the first flow passage 115 and the pilot valve chamber 113 through a clearance between the pilot valve seat 119 and the pilot valve element portion 135. That is, the fluid can flow between the first port 105 and the second port 107 through the first flow passage 115, the pilot valve chamber, and the communication passage 129.

Further, the pressure of the drive fluid in the pilot cylinder chamber 111 when the drive fluid is discharged from the pilot cylinder chamber 111 to separate the pilot valve element portion 135 from the pilot valve seat 119 can be adjusted by adjusting the biasing force by the pilot biasing member 139. The adjustment of the biasing force by the pilot biasing member 139 may be carried out, for example, by selecting the pilot biasing member 139 having a suitable biasing force so that the pilot valve element portion 135 is separated from the pilot valve seat 119 to allow the flow of the fluid when the drive fluid in the pilot cylinder chamber 111 reaches a desired pressure or less. Also, as in the shown embodiment, when the plug member 137 is threaded into the first flow passage 115 and the pilot biasing member 139 is arranged between the plug member 137 and the pilot valve element portion 135, the compressed state of the pilot biasing member 139 when the pilot valve element portion 135 is seated on the pilot valve seat 119 can be changed by rotating the plug member 137 to change the position of the plug member 137 in the first flow passage 115. Therefore, the pressure of the drive fluid in the pilot cylinder chamber 111 when the drive fluid is discharged from the pilot cylinder chamber 111 to separate the pilot valve element portion 135 from the pilot valve seat 119 can be adjusted by rotating the plug member 137 to change the position of the plug member 137 in the first flow passage 115.

In the shown embodiment, the drive port 109, the pilot cylinder chamber 111, the pilot valve chamber 113, the connection hole 114, the pilot piston 131, the pilot rod 133, the pilot valve element portion 135, the plug member 137, and the pilot biasing member 139 constitute the timing adjustment mechanism 101a.

Further, in the shown embodiment, if the biasing force by the pilot biasing member 139 is adjusted so that the biasing force of the pilot biasing member 139 exceeds the force due to the drive fluid in the pilot cylinder chamber 111 to separate the pilot valve element portion 135 from the pilot valve seat 119 when the drive fluid is discharged from the pilot cylinder chamber 111 through the drive port 109 and the pressure of the drive fluid in the pilot cylinder chamber 111 drops below the pressure of the drive fluid in the opening/closing cylinder chamber 37 (specifically, the first fluid chamber 37a thereof) when the valve element 49 is seated on the valve seat 29 in the opening/closing valve unit 15, the timing adjustment mechanism 101a allows the flow of the drive fluid from the second port 107 to the first port 105 when the opening/closing valve unit 15 reaches the valve closed state. As a result, the drive fluid is discharged from the suck-back cylinder chamber 59 (specifically, the second fluid chamber 59b thereof) of the suck-back mechanism unit 17 through the timing adjustment valve 101 and the switching valve 83, thereby making it possible for the suck-back mechanism unit 17 to start the suck-back operation.

The check valve mechanism 101b is arranged in the clearance passage 127. For example, as in the shown embodiment, the check valve mechanism 101b can be configured by a lip packing 149 having a flexible lip structure part such as a U packing, a V packing, a Y packing, or the like, arranged between the outer peripheral surface of the first pilot housing 103a and the inner peripheral surface of the enlarged hole portion 125a of the insertion hole 125 in the second pilot housing 103b. In this case, the lip structure part of the lip packing 149 is arranged on the side closer to the communication passage 129 in the clearance passage 127. Thus, the lip packing 149 allows the fluid to flow in the direction of passing from the first port 105 to the second port 107 through the second flow passage 117 and the clearance passage 127, while preventing the fluid from flowing in the direction of passing from the second port 107 to the first port 105 through the clearance passage 127 and the second flow passage 117. In the shown embodiment, the check valve mechanism 101b is constituted by the Y packing.

Next, the operation of the suckback valve 11 having the configuration shown in FIG. 1 will be described. Here, it is assumed that the first port 105 of the timing adjustment valve 101 is connected to the switching valve 83, and the second port 107 is connected to the suck-back drive fluid port 71 of the suck-back mechanism unit 17. Further, it is assumed that the timing adjustment mechanism 101a of the timing adjustment valve 101 is set such that when the pressure of the drive fluid in the pilot cylinder chamber 111 is reduced to a valve closed pressure P or less, the biasing force due to the pilot biasing member 139 exceeds the force due to the drive fluid in the pilot cylinder chamber 111 and the pilot valve element portion 135 is separated from the pilot valve seat 119, thereby allowing the flow of the drive fluid from the second port 107 to the first port 105 through the pilot valve chamber 113 and the first flow passage 115, where the pressure of the drive fluid of the opening/closing cylinder chamber 37 (specifically, the first fluid chamber 37a thereof) when the valve element 49 is seated on the valve seat 29 in the opening/closing valve unit 15 is defined as the valve closed pressure P.

When the opening/closing valve unit 15 of the suckback valve 11 is brought into the valve closed state, the switching valve 83 is switched so that the drive fluid is supplied from the drive fluid source, not shown, to the opening/closing drive fluid port 53 and the suck-back drive fluid port 71. Then, the force due to the drive fluid supplied to the first fluid chamber 37a of the opening/closing cylinder chamber 37 through the opening/closing drive fluid port 53 exceeds the biasing force due to the opening/closing biasing member 41, so that the opening/closing piston 39 is pushed up, by the force due to the drive fluid in the first fluid chamber 37a, in the direction away from the valve chamber 23 against the biasing force by the opening/closing biasing member 41, to be moved to the valve opening position. Consequently, the valve element 49 connected to the tip of the opening/closing stem 43 is separated from the valve seat 29 as the opening/closing piston 39 rises, and the fluid flowing into the inlet flow passage 19 comes to flow out from the outlet flow passage 21 through the valve chamber 23, the communication passage 27, and the suck-back chamber 25.

At this time, the pressure of the drive fluid in the opening/closing cylinder chamber 37 of the opening/closing valve unit 15 is higher than the valve closed pressure P. As a result, the pressure of the drive fluid supplied into the pilot cylinder chamber 111 through the drive port 109 of the timing adjustment valve 101 becomes higher than the valve closed pressure P. Therefore, in the timing adjustment mechanism 101a of the timing adjustment valve 101, the force due to the drive fluid in the pilot cylinder chamber 111 exceeds the biasing force by the pilot biasing member 139, so that the pilot piston 131 is moved in the direction to approach the pilot valve chamber 113 against the biasing force by the pilot biasing member 139, and the pilot valve element portion 135 is pressed against the pilot valve seat 119 as shown in FIG. 4. That is, the timing adjustment mechanism 101a of the timing adjustment valve 101 does not allow the drive fluid to flow between the first port 105 and the second port 107. On the other hand, the check valve mechanism 101b allows the flow of the drive fluid from the first port 105 to the second port 107. Thus, the drive fluid supplied through the switching valve 83 flows in from the first port 105 of the timing adjustment valve 101 and flows out from the second port 107 through the check valve mechanism 101b, and is also supplied to the suck-back drive fluid port 71. As a result, the force due to the drive fluid supplied to the second fluid chamber 59b of the suck-back cylinder chamber 59 through the suck-back drive fluid port 71 pushes the suck-back piston 61 down in the direction to approach the suck-back chamber 25 against the biasing force by the suck-back biasing member 63 and moves the suck-back piston 61 to the standby position. Thus, the diaphragm 69 connected to the tip of the suck-back piston 61 is brought into a state of being expanded into the suck-back chamber 25, and the suck-back mechanism unit 17 enters a standby state.

When the opening/closing valve unit 15 of the suckback valve 11 is brought into the valve closed state to close off the flow of the fluid, the switching valve 83 is switched to allow the drive fluid to be discharged from the piping connected to the opening/closing drive fluid port 53 and the suck-back drive fluid port 71 to the outside.

When the drive fluid is discharged from the first fluid chamber 37a of the opening/closing cylinder chamber 37 to the switching valve 83 through the opening/closing drive fluid port 53, the pressure of the drive fluid in the first fluid chamber 37a is reduced and the force due to the drive fluid in the first fluid chamber 37a falls below the biasing force by the opening/closing biasing member 41, so that the opening/closing piston 39 is pushed down in the direction to approach the valve chamber 23 according to the biasing force by the opening/closing biasing member 41. When the pressure of the drive fluid in the first fluid chamber 37a is reduced to the valve closed pressure P, the valve element 49 connected to the tip of the opening/closing stem 43 is pressed against the valve seat, so that the flow of the fluid from the inlet flow passage 19 into the valve chamber 23 is closed off.

On the other hand, even if the switching valve 83 is switched so that the drive fluid can be discharged to the outside through the switching valve 83, the pressure of the drive fluid in the opening/closing cylinder chamber 37 of the opening/closing valve unit 15 is higher than the valve closed pressure P until the opening/closing valve unit 15 reaches the valve closed state. At this time, the pressure of the drive fluid supplied into the pilot cylinder chamber 111 through the drive port 109 of the timing adjustment valve 101 becomes higher than the valve closed pressure P. Therefore, in the timing adjustment mechanism 101a of the timing adjustment valve 101, since the force due to the drive fluid in the pilot cylinder chamber 111 exceeds the biasing force by the pilot biasing member 139, the pilot valve element portion 135 still remains in a state of being pressed against the pilot valve seat 119. That is, the timing adjustment mechanism 101a of the timing adjustment valve 101 does not allow the drive fluid to flow between the first port 105 and the second port 107. Further, the check valve mechanism 101b also prevents the drive fluid from flowing from the second port 107 to the first port 105. Therefore, even if the switching valve 83 is switched so that the drive fluid can be discharged to the outside through the switching valve 83, the timing adjustment valve 101 does not allow the flow of the drive fluid from the second port 107 to the first port 105 until the opening/closing valve unit 15 enters the valve closed state. As a result, the drive fluid cannot be discharged from the second fluid chamber 59b of the suck-back cylinder chamber 59 in the suck-back mechanism unit 17, and the suck-back mechanism unit 17 remains in the standby state, so that the suck-back operation is not performed either.

When the switching valve 83 is switched so that the drive fluid can be discharged to the outside through the switching valve 83 and further the opening/closing valve unit 15 enters the valve closed state, the pressure of the drive fluid in the opening/closing cylinder chamber 37 of the opening/closing valve unit 15 is reduced to the valve closed pressure P or less. At this time, the pressure of the drive fluid in the pilot cylinder chamber 111 of the timing adjustment valve 101 is also reduced to the valve closed pressure P or less. Therefore, in the timing adjustment mechanism 101a of the timing adjustment valve 101, the biasing force by the pilot biasing member 139 exceeds the force due to the drive fluid in the pilot valve chamber 113, and hence the pilot piston 131 is moved in the direction away from the pilot valve chamber 113 according to the biasing force by the pilot biasing member 139, so that the pilot valve element portion 135 is separated from the pilot valve seat 119, as shown in FIG. 3. Thus, the timing adjustment mechanism 101a of the timing adjustment valve 101 allows the drive fluid to flow between the first port 105 and the second port 107. On the other hand, the check valve mechanism 101b prevents the drive fluid from flowing from the second port 107 to the first port 105. Therefore, the timing adjustment valve 101 allows the drive fluid to flow from the second port 107 to the first port 105 only through the timing adjustment mechanism 101a. Thus, the drive fluid is discharged from the second fluid chamber 59b of the suck-back cylinder chamber 59 toward the switching valve 83 through the suck-back drive fluid port 71 of the suck-back mechanism unit 17. As a result, the biasing force by the suck-back biasing member 63 exceeds the force due to the drive fluid in the second fluid chamber 59b of the suck-back cylinder chamber 59, and hence the suck-back piston 61 is moved upward in the direction away from the suck-back chamber 25 according to the biasing force by the suck-back biasing member 63. As the suck-back piston 61 moves upward, the diaphragm 69 connected to the suck-back piston 61 via the suck-back stem 65 retracts from the suck-back chamber 25 to increase the volume of the suck-back chamber 25. As a result, the suck-back operation is performed.

In this manner, the suckback valve 11 makes it possible for the suck-back mechanism unit 17 to perform the suck-back operation after the flow of the fluid is closed off by the opening/closing valve unit 15, thereby preventing the fluid from leaking or dripping out off the nozzle being in communication with the outlet flow passage 21 after the valve closing.

Although the suckback valve 11 according to the present invention has been described above with reference to the shown embodiments, the present invention is not limited to the shown embodiments. For example, although the pilot biasing member 139 is arranged within the first flow passage 115 between the pilot valve element portion 135 and the plug member 137 in the shown embodiment, the pilot biasing member 139 can also be arranged in the pilot cylinder chamber 111.

DESCRIPTION OF REFERENCE NUMERALS

11 suckback valve
13 valve main body
15 opening/closing valve unit
17 suck-back mechanism unit
19 inlet flow passage
21 outlet flow passage
23 valve chamber
25 suck-back chamber
29 valve seat
35 opening/closing drive unit housing
37 opening/closing cylinder chamber
39 opening/closing piston
41 opening/closing biasing member
43 opening/closing stem
49 valve element
57 suck-back drive unit housing
59 suck-back cylinder chamber
61 suck-back piston
63 suck-back biasing member
65 suck-back stem
67 through hole
69 diaphragm
83 switching valve
101 timing adjustment valve
101a timing adjustment mechanism
101b check valve mechanism
103 pilot body
105 first port
107 second port
109 drive port
111 pilot cylinder chamber

113 pilot valve chamber
114 connection hole
115 first flow passage
117 second flow passage
119 pilot valve seat
121 first pilot housing
123 second pilot housing
125 insertion hole
127 clearance passage
129 communication passage
131 pilot piston
133 pilot rod
135 pilot valve element portion
137 plug member
137a flow hole
139 pilot biasing member

The invention claimed is:

1. A timing adjustment valve comprising:
a pilot body provided with a first port, a second port, and a drive port and formed with an internal flow passage extending between the first port and the second port;
a check valve mechanism which allows a fluid in the internal flow passage to flow from the first port to the second port and prevents the fluid in the internal flow passage from flowing from the second port to the first port; and
a timing adjustment mechanism which opens and closes the internal flow passage by supplying and discharging a drive fluid to and from the drive port,
wherein the timing adjustment mechanism is arranged in parallel with the check valve mechanism in the internal flow passage and is configured to allow the fluid to flow between the first port and the second port when the pressure of the drive fluid supplied to and discharged from the timing adjustment mechanism through the drive port is equal to or less than a predetermined value.

2. The timing adjustment valve according to claim 1, wherein the pilot body is formed therein with: a pilot cylinder chamber being in communication with the drive port; a pilot valve chamber being in communication with the second port; a connection hole connecting the pilot cylinder chamber and the pilot valve chamber to each other; a first flow passage extending from the pilot valve chamber to the first port; and a second flow passage extending parallel to the first flow passage and being in communication with the first port and the second port, and the first flow passage is provided on a peripheral edge of an opening thereof to the pilot valve chamber with a pilot valve seat, and
wherein the check valve mechanism is arranged between the second port and the second flow passage to prevent the fluid from flowing from the second port to the second flow passage and allow the fluid to flow from the second flow passage to the second port, and the timing adjustment mechanism includes a pilot piston arranged in the pilot cylinder chamber, a pilot rod extending from the pilot piston and inserted through the connection hole, a pilot valve element portion provided at a tip end of the pilot rod and arranged opposite to the pilot valve seat in the pilot valve chamber, a plug member having a flow hole extending through the plug member and attached to an end of the first flow passage connected to the first port, and a pilot biasing member biasing the pilot piston in a direction to separate the pilot valve element portion from the pilot valve seat, and is configured to press the pilot valve element portion against the pilot valve seat against the biasing force by the pilot biasing member by supplying the drive fluid to the pilot cylinder chamber through the drive port to close off the flow of the fluid in the first flow passage.

3. The timing adjustment valve according to claim 2, wherein the pilot biasing member is arranged to be sandwiched between the pilot valve element portion and the plug member.

4. The timing adjustment valve according to claim 3, wherein the plug member is screwed to the end of the first flow passage, so that the position of the plug member in the first flow passage can be adjusted by rotating the plug member.

5. The timing adjustment valve according to claim 2, wherein the pilot body is constituted by a first pilot housing and a second pilot housing, said first pilot housing provided with the drive port, the pilot cylinder chamber, the connection hole, the pilot valve chamber, and the first flow passage, said second pilot housing provided with an insertion hole extending through the second pilot housing, a second flow passage extending parallel to the insertion hole, and the first port and the second port, said first pilot housing inserted into the insertion hole of the second pilot housing so that the second flow passage is in communication with a clearance passage formed between an inner peripheral surface of the insertion hole and an outer peripheral surface of the first pilot housing, said second port and said pilot valve chamber being in communication with each other by a communication passage extending across the first pilot housing and the second pilot housing, said clearance passage connected to the communication passage, said check valve mechanism arranged in the clearance passage.

6. The timing adjustment valve according to claim 5, wherein the check valve mechanism comprises a lip packing arranged between the inner peripheral surface of the insertion hole and the outer peripheral surface of the first pilot housing and having a flexible lip structure part, said lip packing arranged so that the lip structure part is positioned on the side closer to the communication passage.

7. The timing adjustment valve according to claim 6, wherein the lip packing is selected from a U packing, a V packing, and a Y packing.

8. A suckback valve comprising: an opening/closing valve unit opening and closing a fluid passage; a suck-back mechanism unit arranged downstream of the opening/closing valve unit and sucking back the fluid in the fluid passage after the fluid passage is closed by the opening/closing valve unit; and the timing adjustment valve according to claim 1, wherein the opening/closing valve unit and the suck-back mechanism unit are connected to a common switching valve, said switching valve configured to supply and discharge the drive fluid to and from the opening/closing valve unit and the suck-back mechanism unit through the switching valve, said opening/closing valve unit being opened and the suck-back mechanism unit entering a standby state when the supply of the drive fluid through the switching valve is performed, said opening/closing valve unit being closed and the suck-back mechanism unit performing a suck-back operation when the discharge of the drive fluid through the switching valve is performed, said first port and said second port of the timing adjustment valve respectively connected to the switching valve and the suck-back mechanism unit, said drive port of the timing adjustment valve connected to piping between the switching valve and the opening/closing valve unit.

9. The suckback valve according to claim 8, further comprising a valve main body provided with an internal flow passage for a fluid to flow therethrough, including an inlet flow passage and an outlet flow passage, and a suck-back chamber being in communication with the outlet flow passage, said fluid sucked back from the outlet flow passage by using the suck-back mechanism unit to increase the volume of the suck-back chamber after the flow of the fluid in the internal flow passage is closed off by the opening/closing valve unit, wherein the suck-back mechanism unit includes a suck-back drive unit housing having a suck-back cylinder chamber formed therein, a suck-back piston accommodated in the suck-back cylinder chamber and being slidable along an inner peripheral surface of the suck-back cylinder chamber, and a suck-back biasing member being arranged in the suck-back cylinder chamber and biasing the suck-back piston in a direction to increase the volume of the suck-back chamber, said suck-back piston configured to be moved in a direction to decrease the volume of the suck-back chamber against a biasing force of the suck-back biasing member by supplying the drive fluid to the suck-back cylinder chamber.

10. The suckback valve according to claim 9, wherein the suck-back mechanism unit further includes a diaphragm having an outer peripheral edge sandwiched between the suck-back drive unit housing and the valve main body, and a suck-back stem extending from the suck-back piston and inserted through a through hole formed in a bottom portion of the suck-back cylinder chamber, said diaphragm partitioning the suck-back drive unit housing and the suck-back chamber from each other, said diaphragm connected to a tip end of the suck-back stem so that the volume of the suck-back chamber is increased or decreased by deformation of the diaphragm accompanying movement of the suck-back piston.

11. The suckback valve according to claim 9, wherein the valve main body is provided with a valve chamber which is in communication with the inlet flow passage and is in communication with the suck-back chamber via a communication passage, said valve chamber having a valve seat which a valve element is brought into contact with and away from, said valve seat formed in a peripheral edge of an opening from the inlet flow passage to the valve chamber, wherein the opening/closing valve unit includes an opening/closing drive unit housing having an opening/closing cylinder chamber formed therein, an opening/closing piston accommodated in the opening/closing cylinder chamber and being slidable along an inner peripheral surface of the opening/closing cylinder chamber, an opening/closing stem extending from the opening/closing piston so as to penetrate a bottom portion of the opening/closing cylinder chamber and protrude into the valve chamber, and an opening/closing biasing member biasing the opening/closing piston in a direction to cause the valve element connected to a tip end of the opening/closing stem to approach the valve seat, and is configured to move the opening/closing piston in a direction to separate the valve element from the valve seat against a biasing force of the opening/closing biasing member by supplying the drive fluid to the opening/closing cylinder chamber.

12. The suckback valve according to claim 10, wherein the valve main body is provided with a valve chamber which is in communication with the inlet flow passage and is in communication with the suck-back chamber via a communication passage, said valve chamber having a valve seat which a valve element is brought into contact with and away from, said valve seat formed in a peripheral edge of an opening from the inlet flow passage to the valve chamber, wherein the opening/closing valve unit includes an opening/closing drive unit housing having an opening/closing cylinder chamber formed therein, an opening/closing piston accommodated in the opening/closing cylinder chamber and being slidable along an inner peripheral surface of the opening/closing cylinder chamber, an opening/closing stem extending from the opening/closing piston so as to penetrate a bottom portion of the opening/closing cylinder chamber and protrude into the valve chamber, and an opening/closing biasing member biasing the opening/closing piston in a direction to cause the valve element connected to a tip end of the opening/closing stem to approach the valve seat, and is configured to move the opening/closing piston in a direction to separate the valve element from the valve seat against a biasing force of the opening/closing biasing member by supplying the drive fluid to the opening/closing cylinder chamber.

* * * * *